(12) United States Patent
Sumi et al.

(10) Patent No.: US 10,974,770 B2
(45) Date of Patent: Apr. 13, 2021

(54) NETWORK STRUCTURE, SHOCK-ABSORBING BODY, VEHICLE, AND DESIGN METHOD OF NETWORK STRUCTURE

(71) Applicant: MITSUBISHI HEAVY INDUSTRIES, LTD., Tokyo (JP)

(72) Inventors: Daishi Sumi, Tokyo (JP); Akio Kitada, Tokyo (JP); Toshio Onuma, Tokyo (JP); Hiroaki Takahashi, Tokyo (JP); Tetsuya Suzuki, Tokyo (JP); Takatomo Ushiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 328 days.

(21) Appl. No.: 16/078,781

(22) PCT Filed: Nov. 25, 2016

(86) PCT No.: PCT/JP2016/085059
§ 371 (c)(1),
(2) Date: Aug. 22, 2018

(87) PCT Pub. No.: WO2017/145472
PCT Pub. Date: Aug. 31, 2017

(65) Prior Publication Data
US 2019/0084626 A1 Mar. 21, 2019

(30) Foreign Application Priority Data

Feb. 24, 2016 (JP) .............................. JP2016-033467

(51) Int. Cl.
*B62D 29/04* (2006.01)
*F16F 7/12* (2006.01)
(Continued)

(52) U.S. Cl.
CPC ............ *B62D 29/043* (2013.01); *B33Y 50/00* (2014.12); *B33Y 80/00* (2014.12); *B60R 19/02* (2013.01);
(Continued)

(58) Field of Classification Search
CPC .. B62D 29/043; B62D 21/15; B62D 25/2072; B62D 65/00; B60R 19/02; F16F 7/121; F16F 7/123
(Continued)

(56) References Cited

U.S. PATENT DOCUMENTS 4,336,296 A 6/1982 Fukuta et al.
4,352,484 A 10/1982 Gertz et al.
(Continued)

FOREIGN PATENT DOCUMENTS

JP 57-47046 A 3/1982
JP 57-20900 B2 5/1982
(Continued)

OTHER PUBLICATIONS

Written Opinion of the International Searching Authority and International Search Report (forms PCT/ISA/237, PCT/ISA/210 and PCT/ISA/220), dated Feb. 28, 2017, for International Application No. PCT/JP2016/085059, with English translations.
(Continued)

*Primary Examiner* — Joseph D. Pape
(74) *Attorney, Agent, or Firm* — Birch, Stewart, Kolasch & Birch, LLP

(57) ABSTRACT

A network structure is formed in a three-dimensional mesh shape in which a plurality of polyhedron frames are arranged. Each polyhedron frame is formed by a plurality of apexes disposed in a three-dimensional space and connecting members for connecting the apexes. The plurality of polyhedron frames are regularly arranged so that the poly-
(Continued)

hedron frames are displaced at a constant degree when a constant load is applied.

6 Claims, 4 Drawing Sheets

(51) Int. Cl.
    *B62D 21/15* (2006.01)
    *B60R 19/02* (2006.01)
    *B33Y 50/00* (2015.01)
    *B33Y 80/00* (2015.01)
    *B62D 25/20* (2006.01)
    *B62D 65/00* (2006.01)

(52) U.S. Cl.
    CPC ......... *B62D 21/15* (2013.01); *B62D 25/2072* (2013.01); *B62D 65/00* (2013.01); *F16F 7/121* (2013.01); *F16F 7/123* (2013.01)

(58) Field of Classification Search
    USPC .......................... 296/187.03, 187.07, 187.08
    See application file for complete search history.

(56) References Cited

U.S. PATENT DOCUMENTS

| | | | |
|---|---|---|---|
| 5,540,972 A | | 7/1996 | Jaegers et al. |
| 8,313,129 B2* | | 11/2012 | Schuler ................... B60R 19/18 |
| | | | 293/120 |
| 9,162,416 B1 | | 10/2015 | Eckel et al. |
| 2002/0017805 A1* | | 2/2002 | Carroll, III ............. F16F 7/121 |
| | | | 296/187.03 |
| 2009/0087584 A1 | | 4/2009 | Taguchi et al. |
| 2015/0175210 A1* | | 6/2015 | Raymond ................ B60K 1/04 |
| | | | 296/191 |

FOREIGN PATENT DOCUMENTS

| | | |
|---|---|---|
| JP | 7-23535 U | 5/1995 |
| JP | 8-68436 A | 3/1996 |
| JP | 11-351328 A | 12/1999 |
| JP | 2001-246995 A | 9/2001 |
| JP | 2003-320425 A | 11/2003 |
| JP | 2004-142607 A | 5/2004 |
| JP | 2013-216228 A | 10/2013 |
| WO | WO 2007/096957 A1 | 8/2007 |
| WO | WO 98/19843 A1 | 9/2014 |
| WO | WO 2014/137924 A1 | 9/2014 |
| WO | WO 2014/193511 A2 | 12/2014 |
| WO | WO 2015/105859 A1 | 7/2015 |

OTHER PUBLICATIONS

Brennan-Craddock et al., "The design of impact absorbing structures for additive manufacture," Journal of Physics: Conference Series, vol. 382, IOP Publishing, 2012, pp. 1-7 (8 pages total).
Extended European Search Report for European Application No. 16891628.6, dated Mar. 8, 2019.

* cited by examiner

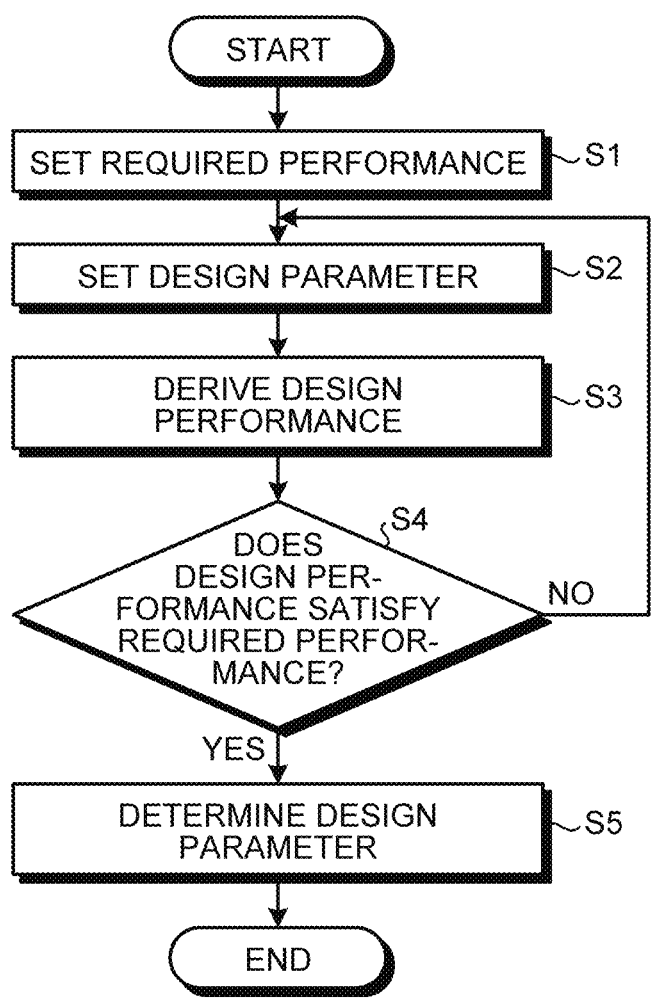

NETWORK STRUCTURE, SHOCK-ABSORBING BODY, VEHICLE, AND DESIGN METHOD OF NETWORK STRUCTURE

FIELD

The present invention relates to a network structure, a shock-absorbing body, a vehicle, and a design method of a network structure.

BACKGROUND

Conventionally, porous metal in which pores are formed has been known (for example, see Patent Literature 1). The porous structure of the porous metal is controlled by carrying out plasma spraying on the surface of the porous metal.

CITATION LIST

Patent Literature

Patent Literature 1: WO2007/096957

SUMMARY

Technical Problem

To use the porous metal for a shock-absorbing body, the porous metal needs to be designed so as to satisfy the required performance of the shock-absorbing body. However, the adjustable design performance range of the porous metal is limited. Thus, the design performance of the porous metal sometimes cannot satisfy the required performance of the shock-absorbing body. In this case, a shock-absorbing body that satisfies the required performance is selected from various types of shock-absorbing materials.

An object of the present invention is to provide a network structure, a shock-absorbing body, a vehicle, and a design method of a network structure capable of suitably adjusting the performance according to deformation and energy absorption with a simple design change.

Solution to Problem

A network structure of the present invention is a network structure formed in a three-dimensional mesh shape in which a plurality of polyhedron frames are arranged, each polyhedron frame being formed by a plurality of apexes disposed in a three-dimensional space and connecting members for connecting the apexes. The plurality of polyhedron frames are regularly arranged so that the polyhedron frames are displaced at a constant degree when a constant load is applied.

With this configuration, it is possible to deform the network structure at a constant displacement, when a constant load is applied to the network structure formed in a three-dimensional mesh shape. In this process, the performance according to deformation and energy absorption of the network structure can be suitably changed by adjusting the shape, material, or the like of each of the connecting members as a design parameter. In this manner, it is possible to suitably adjust the performance of the network structure with a simple design change.

Furthermore, it is preferable that in the plurality of polyhedron frames, one or more types of polyhedron frames are arranged.

With this configuration, it is possible to form the network structure by using one or more types of polyhedron frames.

Furthermore, it is preferable that in the plurality of polyhedron frames, one type of polyhedron frames are arranged so as to fill space.

With this configuration, it is possible to arrange the polyhedron frames in a predetermined space without a gap. Moreover, by setting the polyhedron frames to one type, it is possible to easily design the network structure.

Furthermore, it is preferable that each polyhedron frame is a frame having a truncated octahedron shape.

With this configuration, it is possible to dispose a plurality of the connecting members so that the longitudinal directions of the connecting members of the polyhedron frame, which is the truncated octahedron, differ from one another. Consequently, it is possible to design the performance of the network structure so as to have small anisotropy.

Furthermore, it is preferable that a hollow space formed by the plurality of polyhedron frames is space that allows the connecting members to bend.

With this configuration, when the network structure is deformed upon load being applied to the network structure, the connecting members are not prevented from being bent. Consequently, it is possible to suitably deform the network structure.

Furthermore, it is preferable that a space ratio that is proportion of the hollow space relative to an arrangement space in which the plurality of polyhedron frames are arranged is equal to or more than 50%.

With this configuration, it is possible to suitably obtain the hollow space capable of accommodating the bending connecting members.

A shock-absorbing body of the present invention includes the network structure described above.

With this configuration, it is possible to use the network structure as the shock-absorbing body. Consequently, it is possible to provide the shock-absorbing body that satisfies the required performance.

A vehicle of the present invention includes a vehicle main body; the shock-absorbing body described above, provided to the vehicle main body; and a fixing member used to fix the shock-absorbing body to the vehicle main body.

With this configuration, it is possible to absorb the impact load applied to the vehicle main body by the shock-absorbing body that satisfies the required performance. Consequently, it is possible to reduce the influence of the impact load to the vehicle main body.

Furthermore, it is preferable that the shock-absorbing body is divided into a plurality of pieces and installed in the vehicle.

With this configuration, the shock-absorbing body is divided, and it is possible to easily handle the divided shock-absorbing bodies. Consequently, it is possible to suitably set the shock-absorbing body.

A design method of the present invention is a design method of a network structure formed in a three-dimensional mesh shape in which a plurality of polyhedron frames are arranged, each polyhedron frame being formed by a plurality of apexes disposed in a three-dimensional space and connecting members for connecting the apexes. The design method includes designing the network structure based on design parameters relating to the polyhedron frames. The design parameters are set so as to satisfy required performance of the network structure, and include at least one of a parameter relating to a shape of each connecting member and a parameter relating to a material of the connecting member.

With this configuration, it is possible to design the network structure formed in a three-dimensional mesh shape so that the network structure is deformed at a constant displacement, when a constant load is applied to the network structure. In this process, the performance according to deformation and energy absorption of the network structure can be suitably changed, by adjusting the shape, material, or the like of each of the connecting members as a design parameter. In this manner, it is possible to suitably adjust the performance of the network structure with a simple design change. The parameter relating to the shape of the connecting member includes the thickness of the connecting member, the length of the connecting member, or the like. The parameter relating to the material of the connecting member includes a material strength, selection of using different materials, or the like.

BRIEF DESCRIPTION OF DRAWINGS

FIG. 4 is a flowchart relating to a design method of a shock-absorbing body according to the present embodiment.

DESCRIPTION OF EMBODIMENTS

Hereinafter, an embodiment according to the present invention will be described in detail with reference to the accompanying drawings. It is to be understood that this invention is not limited to the embodiment. Moreover, components of the embodiment described below include components that can be easily replaced by a person skilled in the art, or components that are substantially the same as those components. Furthermore, the components described below can be combined with one another as appropriate. Still furthermore, when there are a plurality of the embodiments, the embodiments can be combined with one another.

Embodiment

Figure 1:
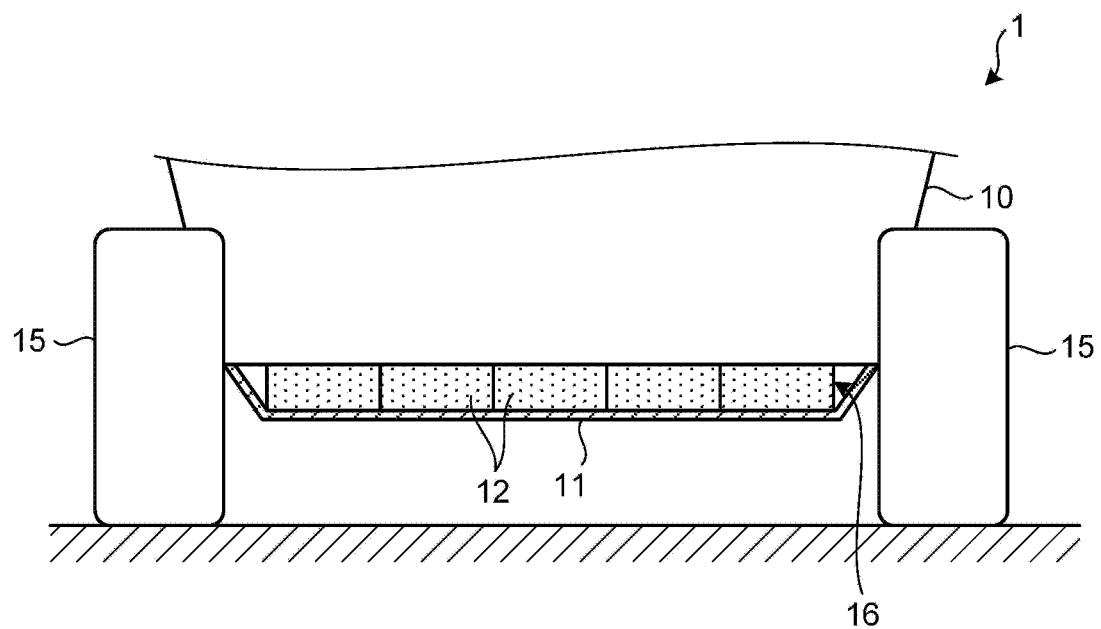
FIG. 1 is a schematic diagram illustrating a vehicle to which a shock-absorbing body according to the present embodiment is applied.
Figure 2:
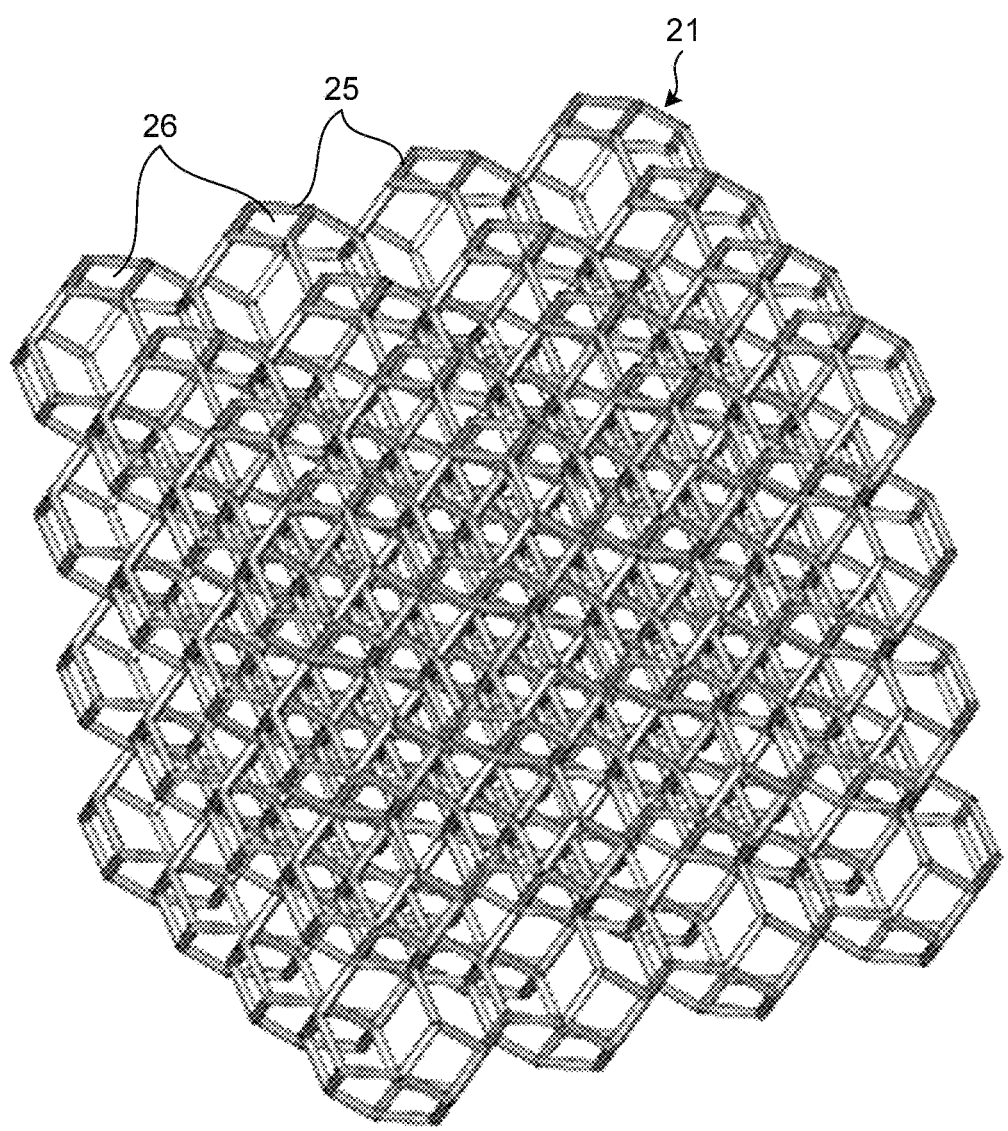
FIG. 2 is a perspective view illustrating the shock-absorbing body according to the present embodiment.
Figure 3:
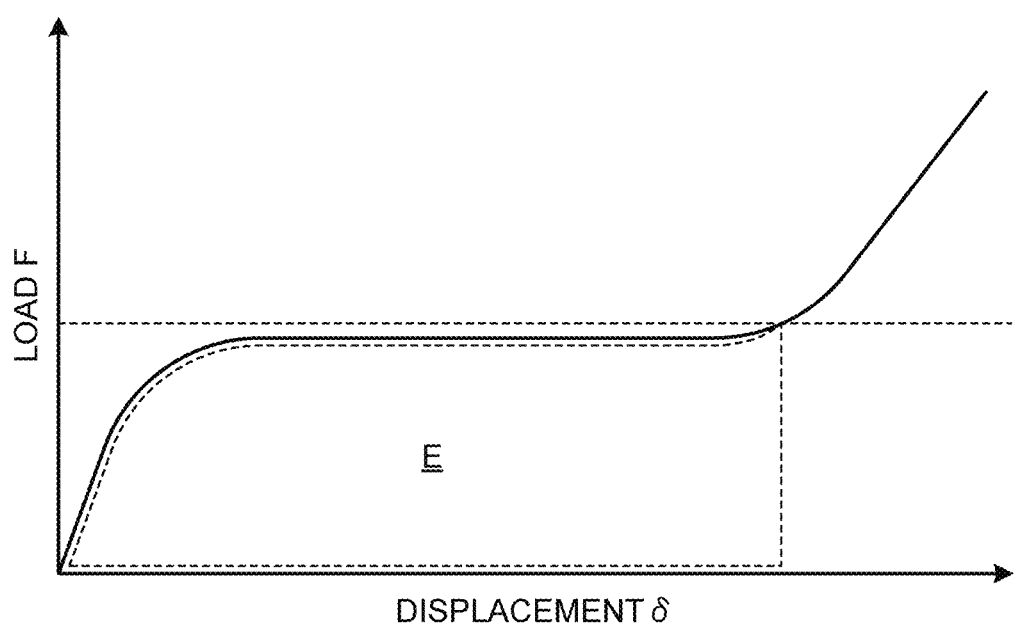
FIG. 3 is a graph relating to the performance of the shock-absorbing body.

FIG. 1 is a schematic diagram illustrating a vehicle to which a shock-absorbing body according to the present embodiment is applied. FIG. 2 is a perspective view illustrating the shock-absorbing body according to the present embodiment. FIG. 3 is a graph relating to the performance of the shock-absorbing body. FIG. 4 is a flowchart relating to a design method of a shock-absorbing body according to the present embodiment.

In the present embodiment, a network structure formed in a three-dimensional mesh shape is used as a shock-absorbing body 12. For example, the shock-absorbing body 12 absorbs the impact applied to the bottom portion of a vehicle 1, by being installed at the bottom portion of the vehicle 1. In the present embodiment, the shock-absorbing body 12 is installed at the bottom portion of the vehicle 1. However, the shock-absorbing body 12 may also be installed at the side surface or upper portion of the vehicle 1, and the installation location of the shock-absorbing body 12 is not particularly limited. First, the vehicle 1 will be explained with reference to FIG. 1.

As illustrated in FIG. 1, the vehicle 1 includes a vehicle main body 10, a casing 11 fixed to the bottom portion of the vehicle main body 10, and the shock-absorbing body 12 installed inside the casing 11. The type of the vehicle 1 is not particularly limited.

A gap is provided between the bottom surface of the vehicle main body 10 and the ground. A wheel 15 is provided at each side of the vehicle main body 10, and the vehicle main body 10 travels on the ground when the wheel 15 is rotated.

The casing 11 is fastened and fixed to the bottom portion of the vehicle main body 10 by a fastening member, which is not illustrated. An installation space 16 for installing the shock-absorbing body 12 is formed between the casing 11 and the bottom surface of the vehicle main body 10. For example, the casing 11 is formed of a steel plate, and when impact is applied to the vehicle 1, the casing 11 is deformed so as to apply surface pressure on the shock-absorbing body 12 installed in the installation space 16.

The shock-absorbing body 12 is divided into a plurality of the shock-absorbing bodies 12 and installed in the installation space 16. For example, the shock-absorbing bodies 12 are arranged in a vehicle width direction (direction of connecting each wheel 15) of the vehicle main body 10. The divided shock-absorbing bodies 12 are formed in a block-shape.

As illustrated in FIG. 2, the shock-absorbing body 12 is formed in a three-dimensional mesh shape in which a plurality of polyhedron frames 21 are juxtaposed. Each of the polyhedron frames 21 is formed of a plurality of apexes disposed in a three-dimensional space and connecting members 25 for connecting the apexes. A mesh 26 is a portion surrounded by a plurality of the connecting members 25. Each of the connecting members 25 is formed in a cylinder shape, and the shape is designed by a design parameter, which will be described below.

In the shock-absorbing body 12, one type of the polyhedron frames 21 are regularly arranged in the vertical direction and the horizontal direction so as to fill the space. In the present embodiment, each of the polyhedron frames 21 is a frame formed in a truncated octahedron shape. It is to be noted that the polyhedron frame 21 is not limited to the truncated octahedron shape, and may also be a cube, an Archimedean prism, a rhombic dodecahedron, and the like. The shape of the polyhedron frame 21 is not particularly limited, as long as the polyhedron frames 21 can fill the space.

In FIG. 3, the vertical axis is a load F, and the horizontal axis is displacement $\delta$. As illustrated in FIG. 3, the shock-absorbing body 12 needs to be displaced at a constant degree (shock-absorbing performance) when a constant load is applied. In this process, because the polyhedron frames 21 are frames in a truncated octahedron shape, the longitudinal directions (axis directions) of a plurality of the connecting members 25 differ from one another. Consequently, the anisotropy of the shock-absorbing performance relative to the impact becomes small. To exert the function of the shock-absorbing body 12 as illustrated in FIG. 3, the shock-absorbing body 12 is obtained by regularly arranging the polyhedron frames 21.

When the shock-absorbing body 12 is displaced by an impact load, the connecting members 25 are bent. In this process, when the connecting members 25 are prevented from being bent, the function of the shock-absorbing body 12 will be deteriorated. Thus, in the shock-absorbing body 12 of the present embodiment, a hollow space formed by the polyhedron frames 21 is a space that allows the connecting members 25 to bend. In this example, the hollow space is a space excluding the space occupied by the connecting members 25, in an arrangement space in which the shock-absorbing body 12 is placed. More specifically, the space ratio that is proportion of the hollow space relative to the arrangement space in which the shock-absorbing body 12 is disposed, is equal to or more than 50%. In other words, the space filling ratio that is proportion of space occupied by the connecting members 25 relative to the arrangement space in which the shock-absorbing body 12 is disposed, is less than 50%.

The shock-absorbing body 12 described above is formed of a metal material, and for example, formed by a three-dimensional lamination shaping method. The material of the shock-absorbing body 12 is not limited to the metal material, and for example, may also be resin or a ceramic material. The forming method of the shock-absorbing body 12 is not limited the three-dimensional lamination shaping method, and may also be casting, cut processing, or the like.

When the shock-absorbing body 12 such as the above is designed based on a design parameter relating to the polyhedron frames 21, it is possible to adjust the shock-absorbing performance of the shock-absorbing body 12, or adjust the shock-absorbing performance of the shock-absorbing body 12 to have isotropy or anisotropy. The design parameter includes a parameter relating to the shape of each of the connecting members 25 and a parameter relating to the material of the connecting member 25. More specifically, the parameter relating to the shape of the connecting member 25 includes thickness of the connecting member 25 formed in a cylinder shape, length of the connecting member 25 in the longitudinal direction, and the like. By adjusting the parameter relating to the shape of the connecting member 25, it is possible to adjust the size of the mesh 26 of the polyhedron frame 21, and change the shape of the polyhedron frame 21. The parameter relating to the material of the connecting member 25 includes material strength and the like. Two or more types of materials may be used for the shock-absorbing body 12, and in this case, selection of materials to be used may also be adopted as the design parameter.

In the vehicle 1 configured in this manner, when impact is applied to the bottom portion of the vehicle main body 10, the impact load is applied to the shock-absorbing body 12 by the casing 11 as surface pressure. When the shock-absorbing body 12 is deformed by the impact load, the shock-absorbing body 12 absorbs the impact load. Consequently, the impact applied to the vehicle 1 is reduced by the shock-absorbing body.

Next, a design method for designing the shock-absorbing body 12 explained above will be described with reference to FIG. 3 and FIG. 4. In the design method of the shock-absorbing body 12, the design performance of the shock-absorbing body 12 is designed so as to satisfy the required performance of the shock-absorbing body 12 that is required in advance.

In the design method of the shock-absorbing body 12, the required performance of the shock-absorbing body 12 is set first (step S1). For example, the required performance is a shock-absorbing performance such as when a constant load F is applied within a range of an area E that is surrounded by the dotted line illustrated in FIG. 3 and the predetermined load F, the displacement δ is increased to a constant degree.

Upon executing step S1, a design parameter of the shock-absorbing body 12 is then set (step S2). More specifically, a case when the required performance of the shock-absorbing body 12 set at step S1 is to reduce the displacement δ relative to the predetermined load F, in other words, a case of making the shock-absorbing body 12 hard and difficult to be deformed, will be described. When the thickness of the connecting member 25 is set as the design parameter, the design parameter is changed so that the thickness of the connecting member 25 is increased. Moreover, when the length of the connecting member 25 is set as the design parameter the design parameter is changed so that the size of the mesh 26 is reduced, by reducing the length of the connecting member 25. Furthermore, when the material strength of the connecting member 25 is set as the design parameter, the design parameter is changed so that the material strength of the connecting member 25 is increased. Still furthermore, when the space ratio is set as the design parameter, the design parameter is changed so that the space ratio is reduced.

On the other hand, a case when the required performance of the shock-absorbing body 12 set at step S1 is to increase the displacement δ relative to the predetermined load F, in other words, a case of making the shock-absorbing body 12 soft and easy to be deformed, will be described. When the thickness of the connecting member 25 is set as the design parameter, the design parameter is changed so that the thickness of the connecting member 25 is reduced. Moreover, when the length of the connecting member 25 is set as the design parameter, the design parameter is changed so that the size of the mesh 26 is increased by increasing the length of the connecting member 25. Furthermore, when the material strength of the connecting member 25 is set as the design parameter, the design parameter is changed so that the material strength of the connecting member 25 is reduced. Still furthermore, when the space ratio is set as the design parameter, the design parameter is changed so that the space ratio is increased.

Then, for example, with the analysis and the like based on the set design parameter, it is possible to derive the design performance of the shock-absorbing body 12 as illustrated by the solid line in FIG. 3 (step S3).

Then, it is determined whether the derived design performance of the shock-absorbing body 12 satisfies the required performance set in advance (step S4). In other words, it is determined whether the design performance, which is the solid line illustrated in FIG. 3, falls within the range of the area E illustrated in FIG. 3. When it is determined that the design performance satisfies the required performance (Yes at step S4), the design parameter is determined (step S5). The shock-absorbing body 12 is then formed by the three-dimensional lamination shaping method, on the basis of the design parameter determined at step S5. On the other hand, when it is determined that the design performance does not satisfy the required performance (No at step S4), the process returns to step S2 again, and the design parameter will be set again.

In this manner, with the present embodiment, when a constant load is applied to the shock-absorbing body 12 formed in a three-dimensional mesh shape, the shock-absorbing body 12 can be deformed at a constant displacement. In this process, the performance according to deformation and energy absorption of the shock-absorbing body 12 can be suitably changed, by adjusting the shape, material, or the like of the connecting member 25 as a design parameter. In this manner, it is possible to suitably adjust the performance of the shock-absorbing body 12 with a simple design change.

Moreover, with the present embodiment, one type of the polyhedron frames 21 can be arranged in the installation space 16 so as to fill the space. Consequently, it is possible to dispose the polyhedron frames 21 in the installation space 16 without a gap. Furthermore, by setting the polyhedron frames 21 to one type, it is possible to prevent the number of design parameters from increasing. Consequently, it is possible to easily design the shock-absorbing body 12.

Furthermore, with the present embodiment, a frame formed in a truncated octahedron shape is used as the polyhedron frame 21. Thus, the longitudinal directions (axis directions) of the connecting members 25 differ from one another. Consequently, it is possible to set the shock-absorbing performance of the shock-absorbing body 12 relative to the impact load to have small anisotropy.

Still furthermore, with the present embodiment, the hollow space formed by the polyhedron frames 21 is set as a space that allows the connecting members 25 to bend. Thus, when the impact load is applied to the shock-absorbing body 12 to deform the shock-absorbing body 12, the connecting members 25 are not prevented from being bent. Consequently, it is possible to suitably deform the shock-absorbing body 12, without reducing the shock-absorbing performance of the shock-absorbing body 12.

Still furthermore, with the present embodiment, by setting the space ratio to equal to or more than 50%, it is possible to suitably obtain the hollow space capable of accommodating the bending connecting members 25.

Still furthermore, with the present embodiment, by installing, in the installation space 16, the shock-absorbing body 12 that satisfies the required performance, it is possible to absorb the impact load applied to the vehicle main body 10. Consequently, it is possible to reduce the influence of the impact load applied to the vehicle main body 10.

Still furthermore, with the present embodiment, the divided shock-absorbing bodies 12 can be easily handled. Consequently, it is possible to suitably install the shock-absorbing body 12 in the installation space 16.

With the present embodiment, the shock-absorbing body 12 is formed by filling one type of the polyhedron frames 21 in the installation space 16. However, the shock-absorbing body 12 may also be formed by using two or more types of the polyhedron frames 21. For example, two types of the polyhedron frames 21 can be alternately disposed in a predetermined direction. For example, the combinations of two types of the polyhedron frames 21 include a regular tetrahedral and a regular octahedral, a regular tetrahedral and a truncated tetrahedral, a regular octahedral and a truncated hexahedron, a regular octahedron and a cuboctahedron, an obliquely truncated octahedron and a regular octagonal pillar, and the like. Moreover, three types of the polyhedron frames 21 can be regularly arranged in a predetermined direction. For example, the combinations of three types of the polyhedron frames 21 include a truncated tetrahedron, a truncated octahedron, and a cuboctahedron; a truncated tetrahedron, a truncated hexahedron, and an oblique truncated cuboctahedron; a regular tetrahedron, a cube, and an oblique cuboctahedron; a cube, a cuboctahedron, and an oblique cuboctahedron; a cube, a truncated octahedron, and an oblique truncated cuboctahedron; and the like. Moreover, the space in one type of the polyhedron frame 21 may be filled with another type of the polyhedron frame 21.

REFERENCE SIGNS LIST

1 Vehicle
10 Vehicle main body
11 Casing
12 Shock-absorbing body
15 Wheel
16 Installation space
21 Polyhedron frame
25 Connecting member
26 Mesh
E Area

The invention claimed is:

1. A network structure formed by a three-dimensional lamination shaping method in a three-dimensional mesh shape in which a plurality of polyhedron frames are arranged, each polyhedron frame being formed by a plurality of apexes disposed in a three-dimensional space and connecting members for connecting the apexes, wherein
the plurality of polyhedron frames are regularly arranged so that the polyhedron frames are displaced at a constant degree when a constant load is applied,
the plurality of polyhedron frames are formed so that a space in one type of polyhedron frame is filled with another type of polyhedron frame,
the one type of polyhedron frame is one of a regular tetrahedral frame and a regular octahedral frame, and
the other type of polyhedron frame is the other of the regular tetrahedral frame and the regular octahedral frame.

2. The network structure according to claim 1, wherein a hollow space formed by the plurality of polyhedron frames is space that allows the connecting members to bend.

3. The network structure according to claim 2, wherein a space ratio that is proportion of the hollow space relative to an arrangement space in which the plurality of polyhedron frames are arranged is equal to or more than 50%.

4. A shock-absorbing body comprising the network structure according to claim 1.

5. A vehicle comprising:
a vehicle main body;
the shock-absorbing body according to claim 4, provided to the vehicle main body; and
a casing on which the shock-absorbing body is installed.

6. The vehicle according to claim 5, wherein the shock-absorbing body is divided into a plurality of pieces and installed in the vehicle.

* * * * *